UNITED STATES PATENT OFFICE.

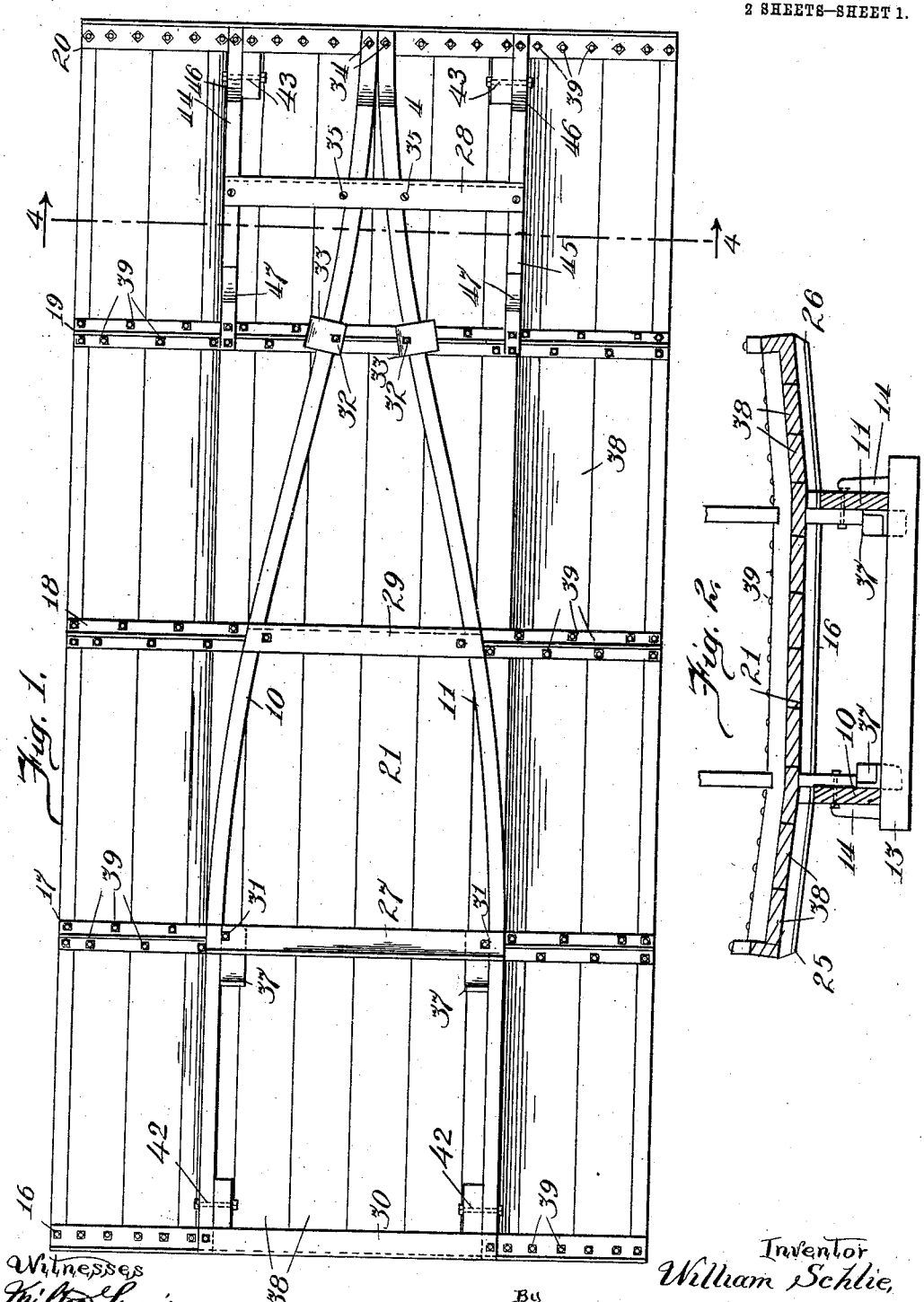

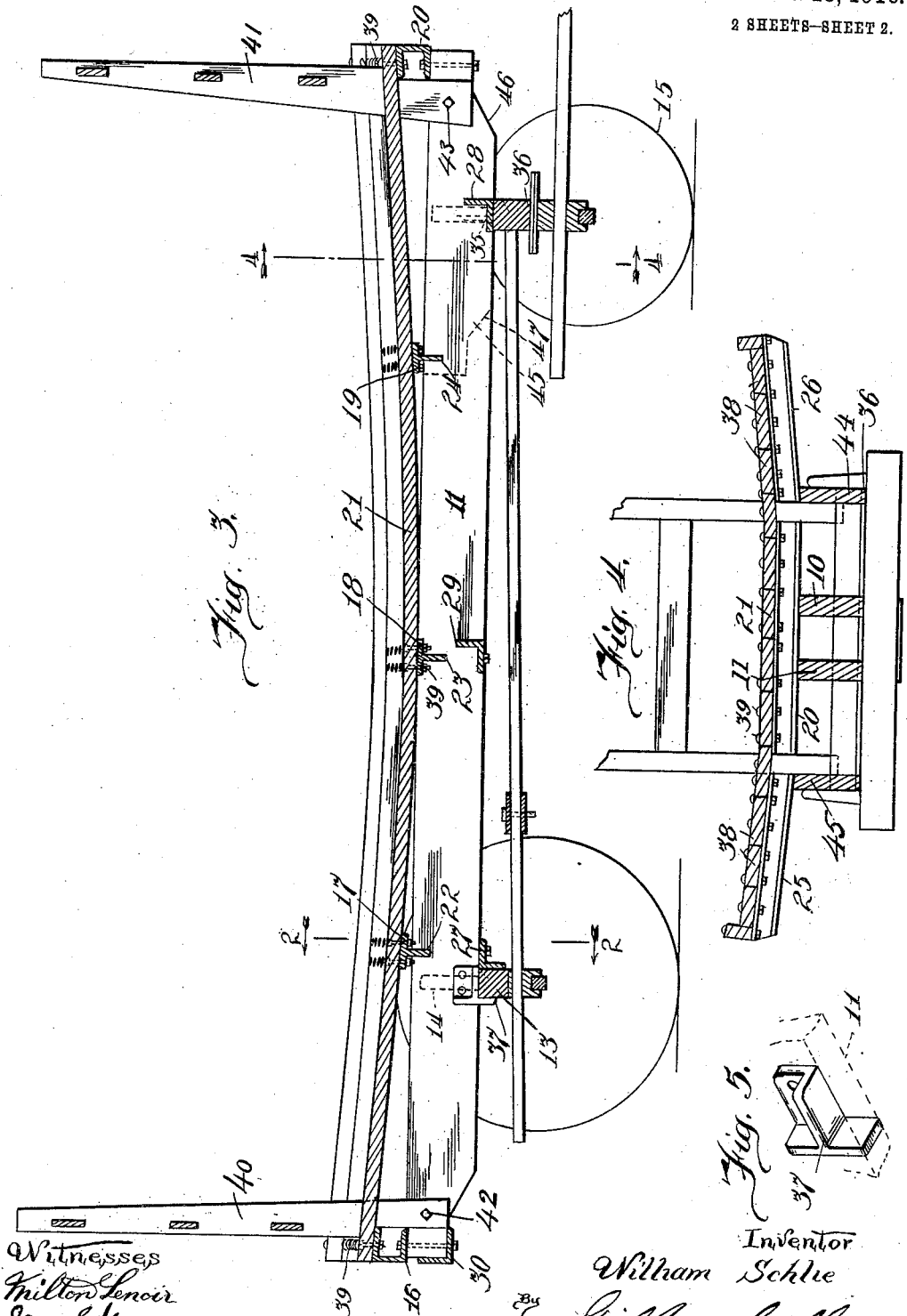

WILLIAM SCHLIE, OF DEERFIELD, ILLINOIS.

HAY-RACK.

978,785.  Specification of Letters Patent.  Patented Dec. 13, 1910.

Application filed April 16, 1910. Serial No. 555,875.

*To all whom it may concern:*

Be it known that I, WILLIAM SCHLIE, a citizen of the United States, and resident of Deerfield, county of Lake, and State of Illinois, have invented certain new and useful Improvements in Hay-Racks, of which the following is a specification, and which are illustrated in the accompanying drawings, forming a part thereof.

The invention relates to wagon bodies and particularly to those having a broad deck, and used for transporting hay and other loose material.

The object of the invention is to produce a wagon body of the type described, which shall be of strong, rigid, and durable construction, but light in weight.

The invention is exemplified in the structure hereinafter to be described and illustrated in the accompanying drawings, in which:—

Figure 1 is an inverted plan view of a wagon body constructed in accordance with the invention. Fig. 2 is a sectional view taken on the line 2—2 of Fig. 3. Fig. 3 is a central longitudinal sectional view of the same. Fig. 4 is a sectional view taken on the lines 4—4 of Figs. 1 and 3. Fig. 5 is a perspective view illustrating a detail of the construction.

The invention contemplates a wagon body which is rendered strong and rigid by being trussed both horizontally and vertically. As shown the frame of the wagon body comprises a pair of longitudinal sills designated by the numerals 10, 11, in the drawings. These sills preferably extend from end to end of the structure. The longitudinal sills, 10, 11, are most desirably made of material which is elastically flexible in a transverse horizontal direction, but is vertically rigid. As shown, strips of wood of oblong rectangular cross section, the vertical dimensions of the cross section being the greater, are employed for this purpose.

At the rear end of the wagon body the longitudinal sills, 10, 11, are disposed substantially parallel for a distance equal to about one third of their length, and at this part of the wagon body they are separated a sufficient distance to fit quite snugly between uprights, as 14, such as are usually mounted upon the ends of the bolster, 13, of a wagon truck. At the forward end of the wagon body the sills 10, 11, are drawn together, preferably by forcibly bending the sills intermediate their ends in such a way that for a short distance adjacent the front of the wagon body the sills are substantially parallel and in contact. Clearance for the front wheels, as 15, of a wagon truck, in turning, is thus provided.

A plurality of transverse sills, 16, 17, 18, 19, 20, are carried by and firmly secured to the longitudinal sills 10, 11. These transverse sills are located at intervals throughout the length of the wagon body, and serve for receiving its floor, or deck, 21. As shown, the transverse sills are mounted at different levels, those at the ends of the wagon body being the higher, thereby giving to the deck, 21, an inward slope or incline from each of its ends. Preferably the transverse sills are composed of rolled metal, those at the ends of the wagon body, as 16, 20, being of channeled cross section, and mounted directly on top of the longitudinal sills, 10, 11, with one of the leaves or flanges of the channel in contact with the upper surface of such sills. The intermediate transverse sills, as 17, 18, 19, are of T-section, the web of the section being countersunk in the upper part of the longitudinal sills 10, 11, as shown at 22, 23, 24 Fig. 3, but in different amounts, the center sill, 18, being the lower. If desired, the ends of the transverse sills, 16, 17, 18, 19, 20, may be bent upwardly as shown at 25, 26, Figs. 2 and 4, thereby causing the floor or deck, 21, to be inclined inwardly from each of its sides as well as from its ends.

Body bolsters, as 27, 28, are secured to the under side of the longitudinal sills, 10, 11. These body bolsters, together with the transverse sills, 16, 17, 18, 19, 20, and certain braces, 29 and 30, secured to the under side of the longitudinal sills 10, 11, intermediate the body bolsters 27, 28, and in rear of the body bolster 27 respectively, serve as connectors and spacing members for the longitudinal sills 10, 11, the parts being firmly bound together by bolts, as 31, 32, 34, 35. To avoid aperturing the longitudinal sills 10, 11, in line with the transverse sills 17, 18, and 19 where the longitudinal sills 10, 11, are flexed, the bolts 32, extend along side of the sills 10, 11, and unite the transverse sill, 19, with hooked members 33, applied to the lower edge of each of the longitudinal sills. The bolts 34, 35, are employed for securing the forward end of the sills, 10, 11, to the end sill, 20, and for securing the body bolster 28 in place, respectively.

The body bolsters 27, 28, and braces 29, 30, are preferably made from rolled metal such as the well known angle iron, commercially obtainable in the market. The bolster 27 is applied to the under side of the longitudinal sills, 10, 11, by the bolts 31, with one of its flanges projecting downwardly to serve as a stop for engaging the bolster 13, of the wagon truck. The angle iron constituting the front bolster 28, however, is preferably countersunk in the sills 10, 11, as shown in Fig. 3 of the drawings, thereby providing a smooth under-surface to the wagon body adjacent its forward end, in order that a sliding engagement may be had with the front bolster, as 36, of the wagon truck. To prevent the sliding of the wagon body on the rear bolster 13, overhanging brackets, 37, illustrated in detail in Fig. 5, of the drawings, are secured to each of the longitudinal sills, 10, 11, in the rear of the body bolster 27, and coöperate with it in engaging the rear bolster, 13, of the truck upon opposite sides.

The floor, or deck, 21, is preferably made of longitudinal strips, 38, each equal in length to the length of the wagon body. These strips are secured directly to each of the transverse sills 16, 17, 18, 19, 20, by bolts or rivets, 39, and are bent downwardly intermediate their ends, as shown in Fig. 3 of the drawings, an amount equal to the difference in level between the intermediate sill 18, and the end sills 16 and 20.

Short longitudinal sill members 44, 45, extend between the transverse sills, 19, 20, to serve as supports for the ends of the front body bolster, 28. The ends of these sill members are preferably tapered as shown at 46, 47, Fig. 3, to provide clearance for the wheels, 15, of the wagon truck in turning.

Ladders, as 40, 41, with which hay racks are commonly equipped, may, if desired, be employed at the ends of the wagon body, these ladders, as shown, being secured in position by having their lower ends set through the deck, 21, and united to the longitudinal sills 10 and 11 and the short longitudinal sill members, 44, 45, respectively, by bolts, as 42, 43.

I claim as my invention:—

In a wagon bottom, in combination, a pair of longitudinal sills spaced apart at their rear ends and converging toward their forward ends, transverse sills mounted on and secured to the longitudinal sills and being inclined upward at their ends, the end transverse sills being mounted at a greater elevation than the intermediate transverse sills, bolster plates secured to and below the longitudinal sills and adapted to rest on and fit between the end stakes of the bolster of a truck, and a deck secured to the transverse sills and conforming to the lines of the upper faces thereof.

WILLIAM SCHLIE.

Witnesses:
CHARLES B. GILLSON,
E. M. KLATCHER.